United States Patent
Vogt

(10) Patent No.: US 10,464,422 B2
(45) Date of Patent: Nov. 5, 2019

(54) DISPLAY AND OPERATING DEVICE FOR A VEHICLE COMPONENT

(71) Applicant: Behr-Hella Thermocontrol GmbH, Stuttgart (DE)

(72) Inventor: Frank Vogt, Lippstadt (DE)

(73) Assignee: BEHR-HELLA THERMOCONTROL GMBH, Stuttgart (DE)

( * ) Notice: Subject to any disclaimer, the term of this patent is extended or adjusted under 35 U.S.C. 154(b) by 21 days.

(21) Appl. No.: 15/568,401

(22) PCT Filed: May 6, 2016

(86) PCT No.: PCT/EP2016/060179
§ 371 (c)(1),
(2) Date: Oct. 20, 2017

(87) PCT Pub. No.: WO2016/177878
PCT Pub. Date: Nov. 10, 2016

(65) Prior Publication Data
US 2018/0099566 A1    Apr. 12, 2018

(30) Foreign Application Priority Data

May 7, 2015   (DE) .................. 10 2015 208 467

(51) Int. Cl.
*G06F 3/041*   (2006.01)
*B60K 37/06*   (2006.01)
(Continued)

(52) U.S. Cl.
CPC .............. *B60K 37/06* (2013.01); *B60K 35/00* (2013.01); *F16H 59/02* (2013.01);
(Continued)

(58) Field of Classification Search
CPC ......... B60K 37/06; B60K 35/00; F16H 63/42; F16H 59/02; F16H 59/0217; G06F 3/041; G06F 3/044; G06F 3/0412
See application file for complete search history.

(56) References Cited

U.S. PATENT DOCUMENTS

| | | | |
|---|---|---|---|
| 7,995,038 B2 | 8/2011 | Vitale et al. | |
| 2003/0188594 A1 | 10/2003 | Levin et al. | |

(Continued)

FOREIGN PATENT DOCUMENTS

| | | |
|---|---|---|
| DE | 10-2004-019893 A1 | 11/2005 |
| DE | 10-2008-023231 A1 | 11/2009 |

(Continued)

OTHER PUBLICATIONS

International Search Report issued in corresponding International Application No. PCT/EP2016/060179), dated Jan. 30, 2017, with English Translation.

*Primary Examiner* — Lisa S Landis
(74) *Attorney, Agent, or Firm* — Morgan, Lewis & Bockius LLP

(57) ABSTRACT

The invention relates to a display and operating device (10) for at least one vehicle component, in particular a radio, a CD and/or DVD player or similar audio and/or video player, a navigation device, an infotainment device, a heating, ventilating or aid condition control unit, or a human-machine interface, which is provided with a mechanical control element (18) for setting an operational parameter of at least one first vehicle component and a touch screen (12) for outputting information, and control keys (14) and/or other operational parameters for the first vehicle component and/or at least one second vehicle component. The touch screen (12) comprises a recess (16) and the mechanical operating element (18) is arranged in the recess (16) of the touch screen (12).

8 Claims, 1 Drawing Sheet

(51) Int. Cl.
    *B60K 35/00*          (2006.01)
    *F16H 59/02*          (2006.01)
    *F16H 63/42*          (2006.01)

(52) U.S. Cl.
    CPC ......... *F16H 59/0217* (2013.01); *F16H 63/42* (2013.01); *B60K 2370/11* (2019.05); *B60K 2370/122* (2019.05); *B60K 2370/126* (2019.05); *B60K 2370/131* (2019.05); *B60K 2370/145* (2019.05); *B60K 2370/1442* (2019.05); *B60K 2370/157* (2019.05); *B60K 2370/158* (2019.05); *B60K 2370/774* (2019.05)

(56) References Cited

U.S. PATENT DOCUMENTS

| | | | |
|---|---|---|---|
| 2005/0276448 A1* | 12/2005 | Pryor | B60K 35/00 382/103 |
| 2010/0214213 A1* | 8/2010 | Bowden | B60K 35/00 345/157 |
| 2011/0025488 A1 | 2/2011 | Leon | |
| 2012/0106096 A1* | 5/2012 | Schober | F16H 63/42 361/748 |

FOREIGN PATENT DOCUMENTS

| | | |
|---|---|---|
| DE | 10-2010-010574 A1 | 9/2011 |
| DE | 10-2011-108214 A1 | 1/2013 |
| JP | 2007-008246 A | 1/2007 |
| WO | 2009/045671 A2 | 4/2009 |
| WO | 2009/138145 A1 | 11/2009 |
| WO | 2015/069311 A1 | 5/2015 |

\* cited by examiner

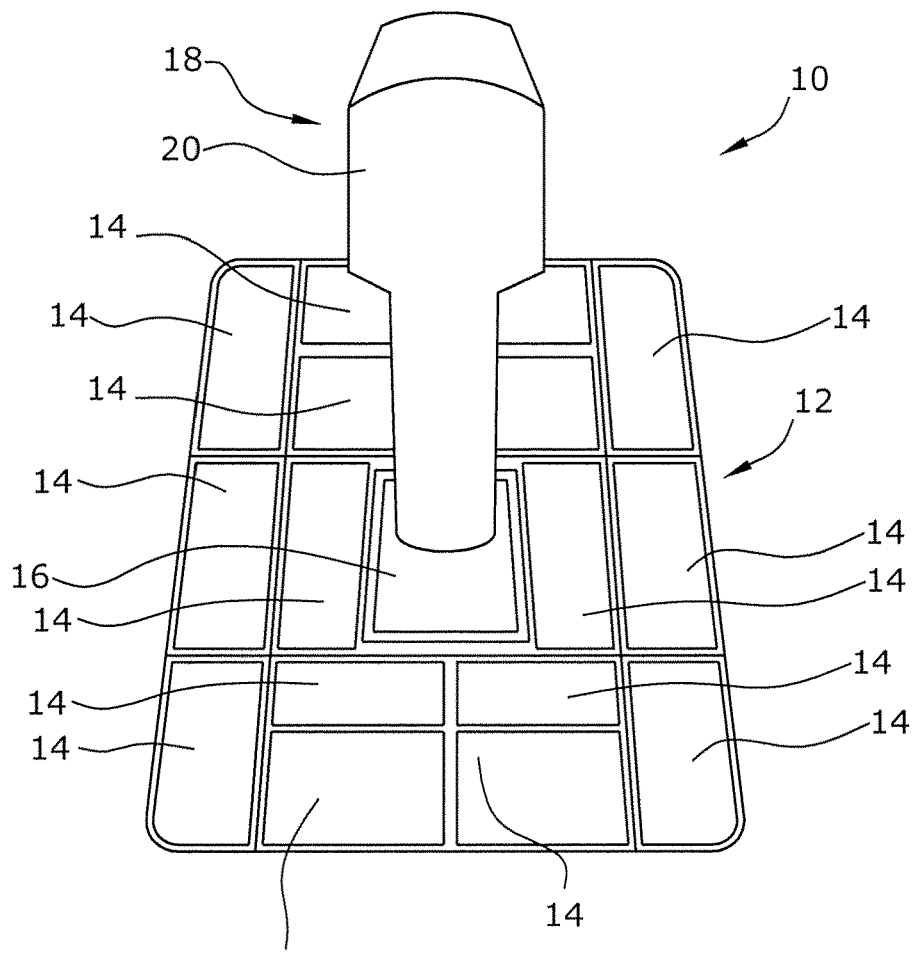
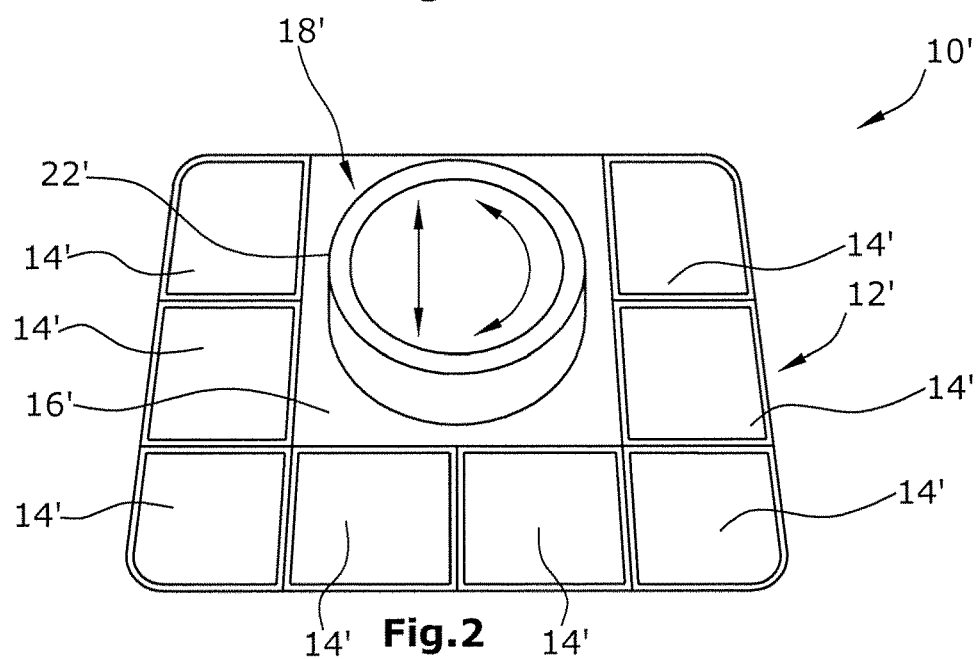

DISPLAY AND OPERATING DEVICE FOR A VEHICLE COMPONENT

CROSS REFERENCE

This application is the U.S. National Phase under 35 U.S.C. § 371 of International Application No. PCT/EP2016/060179, filed on May 6, 2016, which claims the benefit of German Application No. 10 2015 208 467.1, filed on May 7, 2015, the entire contents of each are hereby incorporated by reference.

The invention relates to a display and operating device for a vehicle component which is in particular a radio, a CD and/or DVD player or similar audio and/or video player, a navigation device, an infotainment device, a heating, ventilating and/or air conditioning control unit or a human-machine-interface.

Such display and operating devices are in particular provided in the center console of vehicles for inputting various operational parameters of vehicle components as well as displaying information concerning the vehicle components or the vehicle.

For inputting the operational parameters, mechanical rotary controllers, rotary/press controllers, gear selector levers and mechanical keys are frequently used. These mechanical operating devices serve for adjusting the volume of a multimedia device, the input parameters of a navigation device or the gear in a vehicle, for example. The frequently used mechanical control keys are often equipped with an LED signal light which allows for indicating certain operational parameters to the driver. Thus the driver is informed of the air conditioning system or the rear window heater being switched on, for example.

In WO-A-2009/045671 an operating device for a vehicle is disclosed. In this operating device a rotary controller is arranged in the middle of four touch pads. Thus interspaces are obviously created between the individual touch pads. Both the rotary controller and the individual touch pads serve for operating individual vehicle components. Neither the rotary controller nor the touch pads are designed for displaying information concerning the vehicle components.

Further operating devices without any display function are described in the publications DE-A-10 2011 108 214, DE-A-10 2004 019 893, DE-A-10 2010 010 574, JP-A-2007 008 246 as well as DE-A-2008 023 231. In addition, in the publications US-A-2011/0025488 and US-A-2003/0188594 further operating devices are disclosed.

A problem frequently occurring with known display and operating devices is that interspaces exist between the mechanical control keys, and if the driver or the passengers of the vehicle are not careful when consuming stimulants and/or food in the vehicle, food scraps or liquid may enter into said interspaces. As is generally known, in particular during long trips people increasingly tend to consume food or beverages such that nowadays most vehicles are equipped with cup holders. When food or beverages are consumed, a brief inattention or bumps on the road travelled or a traffic disruption my lead to liquid entering the interspaces between the control key entailing the risk of damaging or destroying the electronic system lying underneath.

It is therefore an object of the invention to provide a display and operating device without any interspaces between control keys such that entering of liquids or food into the display and operating device and a resultant damage or destruction of this device is precluded or at least made considerably more difficult.

For achieving this object the invention suggests a display and operating device for at least one vehicle component which is in particular a radio, a CD and/or DVD player or similar audio and/or video player, a navigation device, an infotainment device, a heating, ventilating and/or air conditioning control unit or a human-machine-interface, wherein the display and operating device is provided with
  a mechanical operating element for setting an operational parameter of at least one first vehicle component, and
  a touch screen for outputting information, for displaying control keys and/or for inputting further operational parameters for the first vehicle component and/or for at least one second vehicle component,
  wherein
  the touch screen comprises a recess, and
  the mechanical operating element is arranged in the recess of the touch screen.

Further, for achieving the object, a vehicle center console having a display and operating device with the aforementioned features as well as a vehicle having a display and operating device or a center console with a display and operating device is proposed, wherein the display and operating device comprises the aforementioned features.

Due to employment of a touch screen with a closed operating surface instead of mechanical control keys the display and operating device according to the invention does not comprises any interspaces between the control keys. The touch screen is a touch-sensitive screen which serves as both an input and an output device. Thus a touch screen differs from a touch pad, for example, which merely serves as an input device and does not offer any output function. For example, LCD displays may used as a touch screen, such as those employed in smartphones and tablets. Further, curved touch screens are also used for this purpose whose shape is adapted to the contour of a vehicle center console, or flexible touch screens which are capable of adapting to the shape of the center console, for example. In the case of the display and operating device according to the invention the touch screen offers the possibility to display control keys, to receive the input of a user and to transfer it to the corresponding vehicle component or to display information of one or a plurality of vehicle components. Further, it is possible for different areas of the touch screen to fulfill different tasks. In addition, the control keys are freely programmable such that the display and operating device according to the invention can be used in different vehicles having different vehicle components without any adaptation of the hardware being necessary.

According to one embodiment of the invention, the mechanical operating element of the display and operating device is designed as a gear selector lever. Thus the mechanical operating element can be used for gear shifting purposes, while via the virtual control keys of the touch screen adjustments of an audio player or adjustments to the chassis can be carried out.

According to a further embodiment of the invention, the mechanical operating element is configured as a rotary operating element or as a rotary/press operating element. The rotary/press operating element can be used for volume adjustment of a CD player or for inputting an address into a navigation device, for example, while the adjustment of a ventilating and air conditioning device, for example, can be carried out via the control keys of the touch screen.

Further, according to a preferred configuration of the display and operating device according to present invention, the touch screen extends annularly around the recess. In this configuration, the control keys are annularly arranged around the mechanical operating element such that they are located in the immediate vicinity of this mechanical operating element. Due to the arrangement of the control keys in the immediate vicinity of the mechanical operating element the driver is offered better accessibility to all elements relevant to the operation of the vehicle components.

According to a further preferred aspect of the invention, the recess of the touch screen is configured as an edge recess. Thus the touch screen is of a U-shape or L-shape configuration, for example. For example, this may be advantageous if it is desired to provide the area located in the immediate vicinity of the driver for displaying the keys as well as for inputting purposes, and not to equip the area located at a distance to the driver and thus less easy to access with control keys and display elements.

According to another embodiment of the invention, the touch screen may further be designed for outputting a mechanical, acoustical or optical feedback upon a tactile input. The mechanical feedback may be in the form of a vibration, for example, which informs the user that the display and operating device has received an input. Further, the user may be informed of the input via an acoustical signal, or he may be warned when the adjusted operational parameters lie within a critical range, for example. Similarly, optical signals may be outputted, such as a flashing indicator, for example, which may warn the user of a danger. Due to the outputted feedback the driver need not draw his attention off the road traffic for operating the display and operating device.

Finally, according to a preferred aspect of the invention, it may be provided that the touch screen is designed for displaying a defined menu upon touch of the mechanical operating element. For this purpose it may be provided that the mechanical operating element is configured as a gear selector lever, for example, and that upon touch of the gear selector lever on the touch screen the options for the gear are displayed. It may also be provided that the mechanical operating element is configured as a rotary operating element or as a rotary/press operating element, and that upon touch of this mechanical operating element a menu for the audio player is shown.

Hereunder the invention is explained in greater detail on the basis of two exemplary embodiments with reference to the drawings in which FIG. 1 shows a perspective view of a first exemplary embodiment of the display and operating device, and FIG. 2 shows a perspective view of a second exemplary embodiment of a display and operating device.

In FIG. 1 a display and operating device 10 is shown which comprises a touch screen 12 having plurality of control key fields, hereinafter referred to as control keys 14. The touch screen 12 further includes a centrally arranged recess 16 in which a mechanical operating element 18 is arranged. In this exemplary embodiment, the mechanical operating element 18 is configured as a gear selector lever 20. Such a display and operating device 10 may typically be provided in a vehicle center console such that the driver mechanically selects the gear and further components of the vehicle by means of the various control keys 14. Which vehicle components are adjusted to which extent via the display and operating device can be programmed at will such that the display and operating device 10 can be manufactured independent of the vehicle equipment. Depending on said vehicle equipment it may be determined by adaptation of the display and operating device software which vehicle components can be controlled to which extent and which operational parameters are to be captured by the display and operating device 10. Further, by adaptation of the software thus the number of the displayed control keys 14 as well as the size of these control keys 14 can be adjusted at will. Further, one or more of the virtual control keys 14 can be replaced in a simple manner by display areas which do not receive any input by the user but can only output information regarding one or a plurality of vehicle components and/or general operational information, such as the current vehicle speed, the fuel consumption or the vehicle interior temperature, for example.

In the exemplary embodiment according to FIG. 2 a display and operating device 10' is illustrated, wherein the recess 16' of the touch screen 12' is configured as an edge recess and the mechanical operating element 18' is configured in the form of a rotary/press operating element 22'. Due to the fact that the recess 16' is configured as an edge recess a larger display and operating area of the touch screen 12' is available to the user, said area being located in his immediate vicinity. Thus there exist no control keys 14' arranged behind the mechanical operating element 18', as seen from the viewpoint of the driver, for example, which control keys might be difficult to access by the driver. In many exemplary applications the touch screen 12' which is U-shaped in this exemplary embodiment offers the user an easier input of the operational parameters and is also easier to read since the mechanical operating element 18' does not obstruct the view to the active area of the touch screen 12'. Further, in the display and operating device 10' illustrated in FIG. 2 the mechanical operating element 18' is configured as a rotary/press operating element 22' which is suitable for operating audio players and navigation devices. In this exemplary embodiment, the active area of the touch screen 12' is divided into numerous areas each of which may serve as a control key 14' or may be reprogrammed at will to serve as display areas.

In both exemplary embodiments it is shown that between the control keys 14 and 14', respectively, illustrated by the touch screen 12 and 12', respectively, no interspaces exist such that the display and operating devices 10 and 10', respectively, of the exemplary embodiments are protected against entering of liquid or food.

LIST OF REFERENCE NUMERALS 10, 10' Display and operating device
12, 12' Touch screen
14, 14' Control keys
16, 16' Recess
18, 18' Mechanical operating element
20 Gear selector lever
22' Rotary/press operating element

The invention claimed is:

1. A display and operating device for at least one vehicle component which is in particular a radio, a CD and/or DVD player or similar audio and/or video player, a navigation device an infotainment device, a heating, ventilating and/or air conditioning control unit or a human-machine interface, having
   a gear selector lever for setting an operational parameter of at least one first vehicle component, and
   a touch screen for outputting information, for displaying control keys and/or for inputting further operational parameters for said first vehicle component and for at least one second vehicle component, wherein
   said touch screen comprises a recess, and
   said gear selector lever is arranged in said recess of said touch screen.

2. The display and operating device according to claim 1, wherein the touch screen annularly extends around the recess.

3. The display and operating device according to claim 1, wherein the recess of the touch screen is configured as an edge recess.

4. The display and operating device according to claim 1, wherein the touch screen is designed for outputting a mechanical, acoustical or optical feedback upon a tactile input.

5. The display and operating device according to claim 1, wherein the touch screen comprise a closed surface.

6. A center console for a vehicle having a display and operating device according to claim 1.

7. A vehicle having a display and operating device according to claim 1.

8. A vehicle having a center console according to claim 6.

\* \* \* \* \*